Jan. 21, 1941.　　　G. C. PEARCE　　　2,229,612
REFRIGERATING APPARATUS
Filed April 28, 1938　　　4 Sheets-Sheet 1

Fig. 1

INVENTOR.
George C Pearce
BY
Spencer Hardman and Fehr
ATTORNEYS

Jan. 21, 1941.   G. C. PEARCE   2,229,612
REFRIGERATING APPARATUS
Filed April 28, 1938   4 Sheets-Sheet 2

INVENTOR.
BY George C Pearce
Spencer Hardman and Who
ATTORNEYS

Jan. 21, 1941.  G. C. PEARCE  2,229,612
REFRIGERATING APPARATUS
Filed April 28, 1938  4 Sheets-Sheet 4

INVENTOR.
BY George C Pearce
Spencer Hardman and John
ATTORNEYS

Patented Jan. 21, 1941

2,229,612

UNITED STATES PATENT OFFICE 2,229,612

REFRIGERATING APPARATUS

George C. Pearce, Dayton, Ohio, assignor to General Motors Corporation, Dayton, Ohio, a corporation of Delaware Application April 28, 1938, Serial No. 204,796

16 Claims. (Cl. 236—44)

This invention relates to refrigerating apparatus and more particularly to control systems and control means for heating and cooling apparatus.

It is an object of my invention to provide an improved control system for heating and cooling apparatus requiring one only room thermostat.

It is another object of my invention to provide an improved control system for heating and cooling apparatus in which means are provided for automatically changing the control from the heating apparatus to the cooling apparatus and vice versa at the proper time.

It is another object of my invention to provide an improved and simplified form of effective temperature control.

It is another object of my invention to provide an improved reliable simple form of a room thermostat which is economical to manufacture, which is conveniently adjustable and which can operate at full or lesser voltages.

It is another object of my invention to provide a room thermostat which is small, compact and yet has all its parts readily accessible.

It is still another object of my invention to provide an improved form of room thermostat in which pivot pins and other sources of friction are eliminated as completely as possible.

It is still another object of my invention to provide an improved form of room thermostat having a simplified form of operating means and a simple, accurate temperature adjustment.

It is still another object of my invention to provide a bimetal type of room thermostat which without the use of a magnet opens and closes the contacts with sufficient rapidity to avoid arcing of the contacts even under full voltage.

Further objects and advantages of the present invention will be apparent from the following description, reference being had to the accompanying drawings, wherein a preferred form of the present invention is clearly shown.

Briefly, I have shown a control system in which a thermostat provided with a weight which absorbs moisture according to changes in the humidity of the atmosphere to provide an effective temperature control for both heating and cooling apparatus. In this system, a switch of the snap acting type controlled by outside temperature changes the control from the heating apparatus to the cooling apparatus and vice versa when the outdoor temperature rises above or falls below certain predetermined temperatures for which the switch is set. With this arrangement only one room thermostat is required for the control of the heating and cooling apparatus.

The effective temperature control incorporates a plurality of bimetal elements arranged in cantilever fashion which are critically stressed by a tension coil spring which causes the bimetal elements to snap from one limiting position to the other. The temperature at which the bimetal elements snap is controlled by the adjustment of the anchoring point of the spring which has its other end connected to the free end of the bimetal elements. This general form of snap acting control mechanism is found in substantially all the modifications shown in this application.

FIGURE 1

Figure 1:
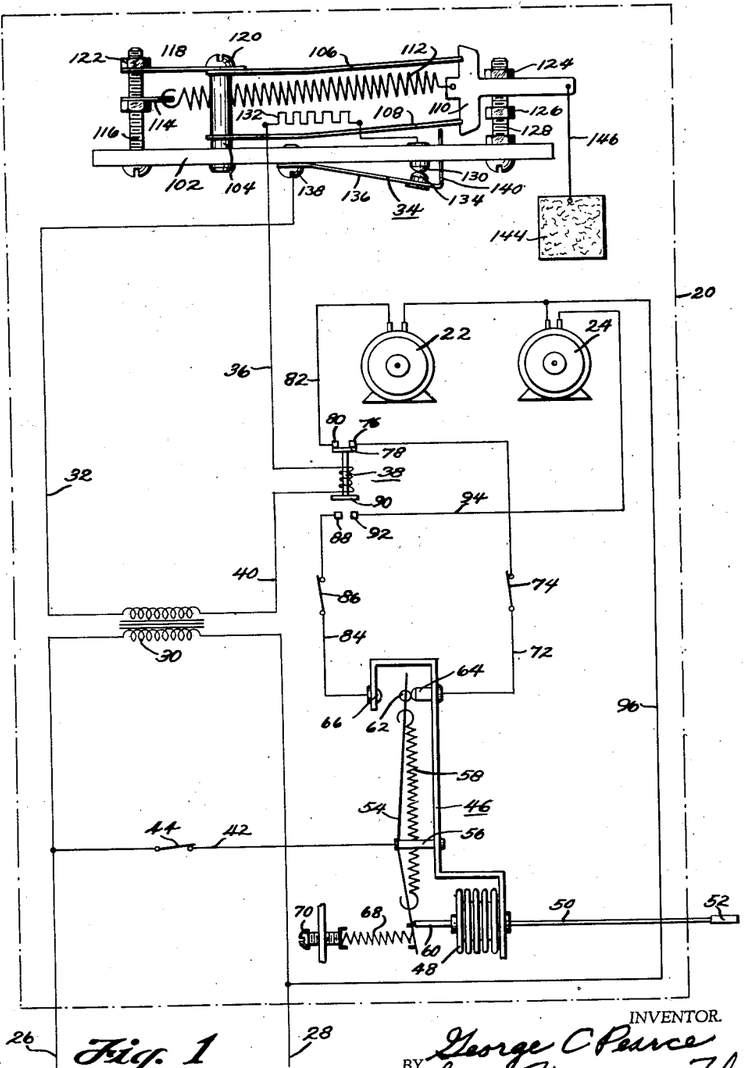
Fig. 1 is a diagrammatic view of an effective temperature control system for heating and cooling apparatus embodying one form of my invention.

Referring now to the drawings and more particularly Fig. 1, there is indicated diagrammatically an enclosure 20 containing a heating apparatus 22 shown as an electric motor which may be used to operate an oil burner or a stoker, and at the side of the motor 22 is another electric motor 24 which may be used, to operate a refrigerating system for cooling the enclosure. The system is provided with power through the electrical conductors 26 and 28 which supply electric energy to the transformer 30 which in turn supplies electric energy at the reduced voltage to the control circuit, which includes the conductor 32, the effective temperature control switch 34, the conductor 36, the two-way relay 38 and the conductor 40. The conductor 26 is connected by the conductor 42 which includes manually operable switch 44 to the snap acting switch means 46 operated by a bellows 48.

This bellows 48 is connected by a small tube 50 to a thermostat bulb 52 located outside the enclosure 20, so that it is subjected to the temperature of the outside air. The snap acting switch means 46 includes a bimetal blade 54 mounted at an intermediate point upon a post 56 and having a tension type coil spring 58 connected to the blade adjacent its opposite ends. The bellows 48 is provided with a stem 60 which bears upon the short end portion of the blade 54 while the other end of the blade is provided with double contacts 62 which are adapted to contact with the stationary contacts 64 and 66. The range of the switch is controlled by a compression type spring 68 which opposes the expansion of the bellows 48 and which has its tension controlled by the adjusting screw 70.

The contact 64 is connected by the conductor 72, which includes a manual switch 74, to a stationary contact 76 engaged by relay contact bar 78 which closes the circuit to the heating motor 22 by carrying the current to the other upper stationary contact 80, which is connected by the conductor 82 to the motor 22. The stationary contact 66 is connected by conductor 84 provided with a manual switch 86 to the contact 88 which is one of the lower stationary contacts for the relay 38. The relay 38 has a lower rigid contact bar 90 which engages and bridges the lower stationary contact 88 and the second lower stationary contact 92 for controlling the flow of electric energy to the conductor 94 which connects to the cooling motor 24. In order to complete the electric circuit, the electric motors 22 and 24 are each connected to the common conductor 96 which connects to the conductor 28 which serves as the second supply conductor, as mentioned before.

*The effective temperature control*

The effective temperature control includes a base 102 upon which is mounted a post 104 carrying a cantilever bimetal blade 106 of resilient bimetal at its upper end, and a second resilient cantilever bimetal member 108 adjacent its lower end which is substantially identical to the bimetal member 106. The free ends of the bimetal members 106 and 108 extend into notches formed in the cross-arms of a cross-shaped member 110. This cross-shaped member 110 has its notches spaced a distance equal to the spacing of the members 106 and 108 upon the tension 104. The cross-shaped member 110 is held in engagement with the free end of members 106 and 108 by a tension type coil spring 112 which extends substantially in the same direction as bimetal members 106 and 108 to an anchorage 114 located beyond the post upon a vertical adjusting screw 116.

The anchorage 114 is in the form of a small flat piece of metal which is welded or soldered to a nut which is threaded onto the adjusting screw 116. The upper end of the adjusting screw 116 is rotatably mounted in an aperture provided in the sheet metal arm 118 extending from the base 104 and fastened to the post 104 by a screw 120. The upper end of the adjusting screw 116 is provided with a nut 122 resting upon the arm 118. This nut 122 is soldered to the post 102 so that it rotates with the adjusting screw 116 when the adjusting screw is turned to move the anchorage 114 upwardly or downwardly to change the position of the anchoring point of the tension spring 112.

The coil spring 112 has such a tension as to provide a critical load upon the ends of the bimetal members 106 and 108. The movement of the bimetal members 106 and 108 is limited by the nuts 124 and 126 which engage the long leg of the cross-shaped member 110 to limit its movement. These nuts 124 and 126 are threaded onto a screw 128 which is fastened to and projects upwardly from the base 102.

A stationary contact 130 is provided upon the bottom of the base 102 and is connected by a conductor to the heater 132 which is connected in series with the contacts and is employed for overcoming a portion of the differential of the switch, particularly for the purpose of compensating for the lag in the heating system. The movable contact 134 is provided upon the spring metal member 136 which is fastened to the bottom of the base 102 by a screw 138 which is connected to the conductor 32. The spring member 136 is arranged in cantilever fashion and has an upwardly projecting arm 140 beyond the contact 134 which extends through the base and is located in the path of movement of the bimetal strip 108. This spring member 136 is normally sprung upwardly with sufficient tension to provide satisfactory contact pressure between the contacts 130 and 134.

*The humidity element*

Thus far the control described constitutes a thermostat switch of a peculiar double bimetal type. In order to make this an effective temperature control I suspend an element 144 from the end of the long cross-arm of the cross-shaped member 110 by means of a wire threaded on a guard 146. This member 144 preferably is of highly absorbent material, such as blotting paper which is saturated with a weak solution, such as a 5% solution of lithium chloride or calcium chloride. The solutions of this type absorb and give off moisture in accordance with the humidity of the surrounding atmosphere. Thus their weight varies with the amount of humidity in the air. This weight is added to the force upon the bimetal members 106 and 108 so that the bimetals are influenced by the humidity of the air as well as by the temperature of the air. The element 144 should have such a surface and such an amount of solution that it will influence the bimetals in such a proportion to the influence of temperature upon the bimetals so as to make the control responsive to the effective temperature of the air rather than solely to the dry bulb temperature.

When the outside air temperature is cold, the switch 46 is in the position shown in the figure so that current flows from the conductor 26 through the conductor 42, the plate 54, the contacts 62 and 64 and the conductor 72 to the upper stationary contact 76 of the relay 38. If the effective temperature of the air is such as to require more heat, for example, if the humidity is average and the temperature is below 70° F. the switch 34 will be closed, thus closing the control circuit and energizing the relay 38 to cause the contact bar 78 to bridge the contacts 76 and 80 and cause current to flow to the heating motor 22, which will operate to supply heat to the enclosure 20. The anticipating heater 132 will then be in operation and a small increase in temperature of the enclosure 20 will cause the switch 34 to be opened. This will deenergize the relay 38 and cause the contact bar 78 to drop to open position.

This will stop the heating system and the heating system will remain idle until the effective temperature again falls sufficiently to cause the bimetal elements 106 and 108 to move to their upper position in which the contacts 130 and 134 are sprung closed. It should be noted that when the heating system is idle the contact bar 90 engages the contacts 88 and 92. However, since the contact 62 is out of engagement with the contact 66 no current flows to the cooling motor 24.

However, should the outside temperature rise to about 75° or 80° F. the switch 46 will be actuated and the expansion of the volatile fluid in the bellows 48 will cause the blade 54 to be snapped to its other position in which the contact 62 is in engagement with the contact 66. Under this condition when the temperature is below normal the contacts 130 and 134 will be closed as before. This will cause the relay 38 to be energized thus raising the contact bar 90 away from the contacts 88 and 92 so that no current will be supplied to the cooling motor 24. Should the temperature within the enclosure 20 rise, the contacts 130 and 134 will be opened by the effective temperature control 34. This will deenergize the relay 38 and cause the contact bar 90 to bridge the contacts 88 and 92 to supply the motor 24 with electric energy to cool the enclosure 20. As long as the master switch 46 has the contacts 62 in engagement with the contact 66 no current can be supplied to the heating motor 22.

Should the outside temperature fall to 70° or 75° F. the switch 46 will again move to the position shown in Fig. 1 so that heating may again be obtained. If either heating or cooling is not desired either of the switches 74 or 86 may be opened.

FIGURES 2 TO 7

Figures 4, 5, 6, 7:
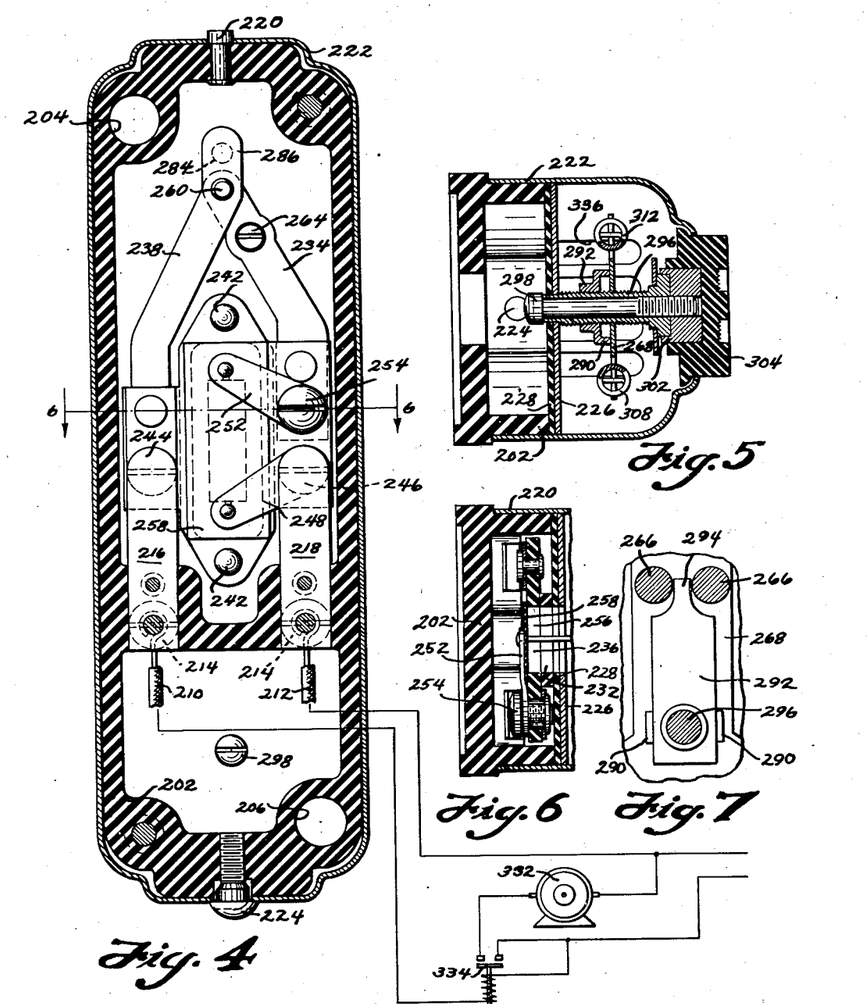
Fig. 4 is a section taken along the lines 4—4 of Fig. 2.
Fig. 5 is a section taken along the lines 5—5 of Fig. 2.
Fig. 6 is a section taken along the lines 6—6 of Fig. 4.
Fig. 7 is a section taken along the lines 7—7 of Fig. 2.

In Figs. 2 to 7 inclusive there is shown a commercial form of my improved type of bimetal control. This is shown in the form of a wall thermostat and is provided with a base 202 of a molded electrical insulating material which is adapted to be fastened to the wall. Openings 204 and 206 are provided in the base for this purpose. This base 202 is provided with an opening 208 through which connections may be made to the electric wiring in the walls of the building. As shown in Fig. 4 the electrical conductors 210 and 212 are fastened to the binding screws 214. These binding screws are electrically connected to spring metal members 216 and 218 which are fastened to the base by rivets. The base is also provided with a pin 220 at the top which receives the aperture in the top of the cover 222 which encloses the switch mechanism. The bottom of the cover 222 is firmly held in place by a fastening screw 224 which is threaded through the bottom of the outer cover into a rim portion of the base. This cover is removable from the base as is the switch mechanism proper.

The switch mechanism proper is mounted upon a metal plate 226 which is separated from the base by insulating material 228 of slightly greater thickness. These pieces 226 and 228 are fastened to the base by screws 230. The metal plate 226 has riveted to it, on the face provided with the insulating sheet 228, an assembly which includes an insulating member 232, a bent metal blade 234 forming a stationary contact blade, another insulating member 236 and a second movable contact blade 238. This assembly is riveted to the metal base 226 by rivets 242. The contact blades 234 and 238 are kept separate and insulated from each other by the insulating piece 236. The contact blade 218 makes contact with a screw 244 which is screwed into a small plate which in turn is fastened to the blade 238.

A screw 246 is fastened to a metal arm 248 which carries the conductor provided at one end of the carbon type heater 250 while the conductor at the other end of the carbon type heater is fastened to the arm 252 which is held in place by the screw 254. The metal plate 226, the sheet of insulation 228 and the two pieces of insulation 232 and 236 are all provided with an aperture 256 through which the carbon type heater 250 projects. This opening is covered by another thin piece of insulation 258 so that a well insulated compartment is provided between the sheet metal plate 226 and the base 202 within which the contacts may be safely operated.

The blade 238 is provided with a movable contact 260 while the stationary contact 262 is provided upon the blade 234. The blade 234 is provided with a set-screw 264 which adjusts its position with reference to the plate 226.

The plate 226 has a pair of main posts 266 riveted to it and these main posts at their upper ends have a bimetal blade 268 riveted to them and extending therefrom in two directions. Also riveted to the outer ends of the posts 266 over the bimetal blade 268 is a supporting member 270 which is supported at the other end by a high post 272 which extends to and is riveted to the metal plate 226. The longer portion of the bimetal blade 268 extends upwardly and operates between the end of a hollow post 274 and an adjusting nut 276 which is threaded onto the screw 278 which is riveted to the plate 226. The blade has its upper end stiffened by the inverted U-shaped rib 280 which is pressed into it. This inverted U-shaped rib stiffens the end of the blade and tends to prevent the upper portion of the blade from assuming an S shape. This ribbing stiffens the upper third of the portion of the blade above the posts 266. The remaining portion of the blade between the ribbed portion 280 and the posts 266 is provided with a central slot 282 to prevent the blade from being too stiff under certain temperature conditions.

The upper end of the blade is adapted to operate an insulating pin 284 which extends through the hollow post 274 into contact with the upper extension 286 of the blade 238. The pin 284 should be somewhat shorter than the distance between the extending portion 286 of the contact blade 238 and the upper portion of the bimetal 268 when it is against the stop nut 276. It, however, should be longer than the distance between these blades when the upper end of the bimetal is against the hollow stop member 274 so that the contacts 260 and 262 may be separated. The set-screw 264 may be adjusted to vary the amount of separation provided for the contacts. The nut 276 may be adjusted closer or further away from the post 274 to decrease or increase the differential of the switch.

The other end of the bimetal 268 is bent slightly below the posts 266 toward the plate 226. This causes this portion of the blade to rest against the wings 290 upon an adjusting member 292 which has a tongue 294 extending between and guided by the posts 266. The portion of the adjusting member 292 between the wing portions 290 is extruded and threaded so as to receive the threaded portion of the main adjusting screw 296. This main adjusting screw is hollow and has another screw 298 extending through it which is threaded into a metal portion 302 which is molded into the temperature control knob 304. This temperature control knob is preferably made of some suitable ornamental plastic and has figures and marks molded therein to indicate different temperature settings. The hollow screw 296 is locked to the knob 304 solely by the friction between the metal insert 302 and the head of the screw 296. The screw 298 is tightened sufficiently so that this friction is great enough that there will be no slippage between the knob and the screw 296. By such a connection any desired relation between the knob and the hollow screw may be made by loosening the inner screw 298, turning the knob relative to the hollow screw and again tightening the inner screw 298.

Figure 2:
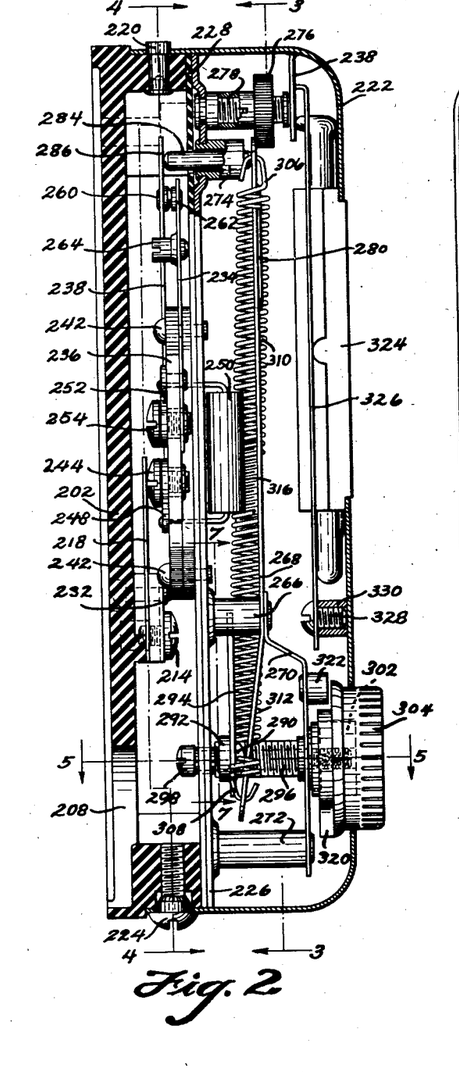
Fig. 2 is a vertical sectional view through a form of room thermostat embodying my invention.
Figure 3:
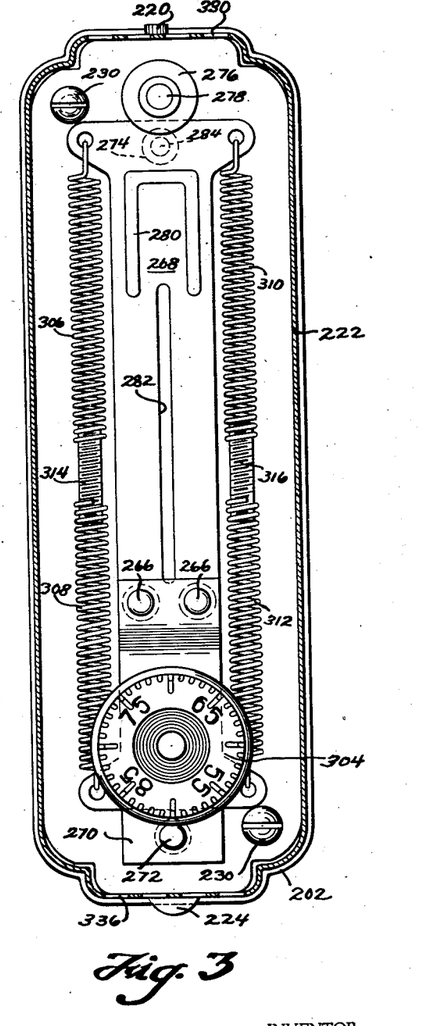
Fig. 3 is a section taken along the lines 3—3 of Fig. 2.

The bimetal blade 268 is provided with ears at its extreme four corners which are connected by tension coil springs 306, 308, 310 and 312 and the threaded connectors 314 and 316. In Fig. 2 the greater portion of the springs 306 and 308 are broken away and the connector 314 has been removed in order to better show the construction of the switch. The connectors 314 and 316 serve as an adjustment for the tension of the springs so that the springs may be set to the particular tension which is required to critically load the upper end of the bimetal 268 so that it will move from either of its stops to the other with a snap action.

In this modification only the portion of the bimetal blade 268 above the posts 266 is active and it is really only the portion between these posts and the riveted portion that is fully active. The portion below the posts which rests against the wings 290 and the adjusting member 292 is used solely for the purpose of adjusting the anchor point of the lower ends of the spring means. By turning knob 304, the bent lower end of the bimetal member 268 is moved toward or away from the plate 226 in order to change the temperature at which the upper portion of the bimetal 268 snaps from one limit of movement to the other. This form of adjustment provides a relatively wide range of temperature selection with accuracy, and it does it in a very simple manner. The adjusting knob 304 is provided with a rib 320 which is adapted to be stopped by a post 322 which is riveted upon the metal support member 270 which serves as the outer bearing for hollow screw 296 while the metal plate 226 serves as the inner bearing for the hollow screw.

As mentioned before, the entire switch mechanism is mounted upon and removable with the metal plate 226. The removal of this switch mechanism makes accessible the binding screws 214 to which the control wires may be fastened. The outer cover is, of course, also removable and carries a mercury type thermometer 324 which is backed by metal supporting means 326 which is held at its upper end by tongues 328 which are bent downwardly from the openings 350 provided in the top of the outer case 222. The lower end of the metal supporting means 326 for the thermometer 324 is fastened by a screw 328 which threads into a post 330 fastened to the inner face of the cup.

Fig. 4 shows the connection of this control to a heating means which includes an electric motor 332 for driving a stoker or oil burner. This motor 332 is controlled by a relay 334 which is connected in series with the conductors 210 and 212 connecting to the thermostat control through the opening 208 in the base 202. The conductors 210 and 212 are connected to the same power lines with which the motor 332 is supplied and operated with the same voltage as the motor 332. The motor 332 may also be used to drive refrigerating apparatus for cooling purposes and in this event the only change that need be made is to reverse the bimetal 268 and to bend the lower portion of the bimetal below the posts 266 toward the metal plates 226 so that the bimetal engages the wings 290 of the adjusting member 292. With this construction the switch may operate at the same voltage carried by a motor 332 with full speed. The bottom portion and the cover is provided with ventilating openings 336 so that the portion of the control containing the bimetal 268 may be adequately ventilated.

When using the control for a refrigerating system the anticipating heater 250 must be omitted and a connection must be made from the screw 246 to the fixed blade 234. If it is desired to use an anticipating heater for controlling cooling, a high resistance heater must be used and the upper arm corresponding to the arm 252 of the heater should be connected to the screw 244 or the rivet just above the screw 244. In this way this control is easily adapted for either heating or cooling the control. If it is desired to use this as an effective temperature control a humidity element such as the element shown in Fig. 1, may be used and connected to the upper end of the bimetal plate 268 so that it will tend to pull the bimetal blade away from the contacts when used for heating and toward the contacts when used for controlling cooling.

FIGURE 8

Figure 8:
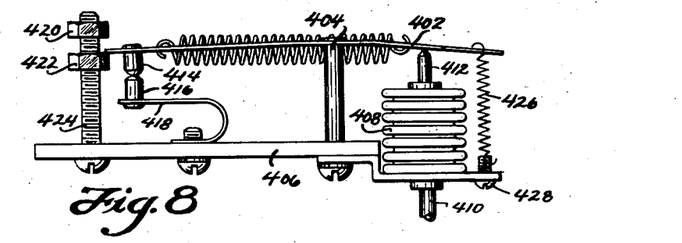
Fig. 8 is an elevational view of another form of thermostat embodying my invention.

In Fig. 8 there is shown a pressure-operated form of switch in which this same type of construction is employed and the same general snap action principle is employed. In this form a thin spring metal blade 402 is anchored at an intermediate point upon posts 404 which are fastened to the base 406. A bellows 408 is supported by the base and is connected to a thermostatic bulb by a tube 410. The upper end of the bellows is provided with a conical point 412 which engages the short end of the strip 402. The long end of the metal strip 402 is provided with a contact 414 adapted to engage a spring mounted contact 416 mounted upon the free end of the leaf spring member 418 fastened to the base 406. The free end of the blade 402 is limited in its movement by the nuts 420 and 422 which are threaded upon the screw 424 fastened to the base. The short end of the blade 402 held against the upper conical point 412 by a tension type coil spring 426 which is fastened at its lower end to an adjusting screw 428 for adjusting the range of the switch while the differential is adjusted by the nuts 420 and 422. This construction provides a very simple pressure-operated switch with friction reduced to a very low value.

FIGURE 9

Figure 9:
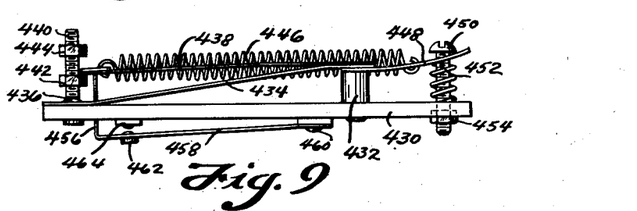
Fig. 9 is an elevational view of still another form of a thermostat embodying my invention.

In Fig. 9 there is shown another modification form of switch resembling the form shown in the previous figures. It includes a base 430 provided with a post 432 upon which rests a comparatively heavy bimetal member 434. The other end of this bimetal member 434 is riveted to the base by the rivets 436. The end of the bimetal member 434 which rests on top of the base 432 is not fastened to the post but is rockable thereon. The post may be made with a rounded or curved upper surface so that this upper end of the bimetal may freely rock thereon. This end of the bimetal member above the post 432 is welded to a thinner bimetal blade 438 which extends in the same direction as the bimetal 434. This bimetal blade 438 is free to move to a limited extent at the end adjacent the rivet 436 where a screw 440 is provided. This screw 440 is fastened to the base and provided with the nuts 442 and 444 which limit the movement of the free end of the bimetal blade 438.

The free end of the bimetal blade 438 has a tension type coil spring 446 connected to it and extending toward the post 432. The post 432 has a U-shaped metal member 448 fastened to and extending in an opposite direction from the bimetal members. This U-shaped member has the other end of the tension spring 446 fastened to it. This metal member 448 may be moved toward or away from the base 430 by the adjusting screw 450 for changing the anchoring point of the spring 446 in order to change the temperature at which the bimetal blade 438 is snapped from one stop screw to the other. A spring 452 holds the metal member 448 in contact with the head of the screw 450 while the bottom of the screw 450 is threaded into the base which is provided with a nut 454 held firmly by the base.

The spring 446 is provided with sufficient tension as to impose a critical load upon the bimetal blade 438 so as to cause it to snap from one stop nut to the other. The free end of the blade 438 is adapted to strike an upwardly extending portion 456 of a spring contact support 458 which is fastened to the base by the rivet 460. This spring contact member 458 is normally sprung to contact closed position with sufficient force to provide satisfactory contact pressure. This member 458 is provided with a movable contact 462 which is adapted to make contact with the stationary contact 464. It will be seen that this form of control may be made shorter than the other embodiments because the curling of the bimetal blade 448 due to temperature is augmented by the curling of the bimetal blade 434 also due to temperature. If desired a double set of blades side by side may be employed or a double set of springs may be employed.

FIGURES 10 AND 11

Figures 10, 11:
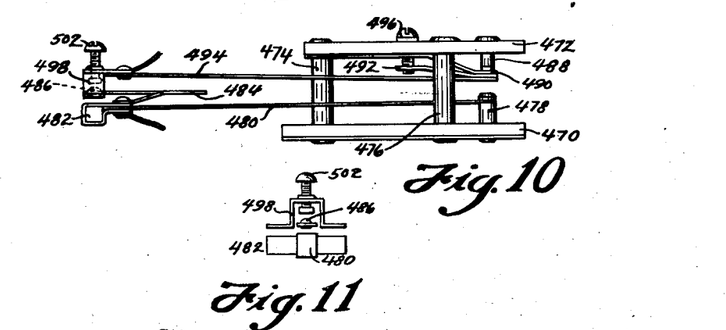
Fig. 10 is a view in elevation of another form of thermostat embodying my invention.
Fig. 11 is an end view of the thermostat shown in Fig. 10.

In Figs. 10 and 11 still another form of control is shown in which there is provided a lower base 470 and an upper base 472 held in spaced relation by the posts 474 and 476. The lower base 470 is provided with a post 478 which supports one end of the cantilever type bimetal blade 480. The free end of this cantilever bimetal blade 480 is provided with a permanent magnet 482 and a contact supporting spring member 484 which supports a contact 486. The upper base 472 is provided with a post 488. Resting against this post but not fastened to it is one end of a bent spring metal member 490 having a greater portion of its other end fastened to the upper base 472. Immediately beneath this member 490 is an adjusting member 492 which is fastened to the member 490 and to an upper cantilever bimetal blade 494. An adjusting screw 496 rotatably mounted in the upper base 472 pulls the adjusting member 492 upwardly or downwardly against the tension of the spring member 490 which has a tendency to turn the bimetal blade 494 in a counter-clockwise direction to the post 488.

The other end of the bimetal blade 494 has an armature 498 formed into a U shape out of soft iron for cooperating with the permanent magnet 482. A contact is also carried by this armature at the bottom end of an adjusting screw 502 which is threaded through the armature for making contact with a spring mounted contact 486. By providing a bimetal for supporting the permanent magnet and another bimetal for supporting the armature, each supporting a contact, I have provided a more sensitive switch and in addition, whenever the switch is subject to vibration the vibration will affect each about equally.

FIGURE 12

Figure 12:
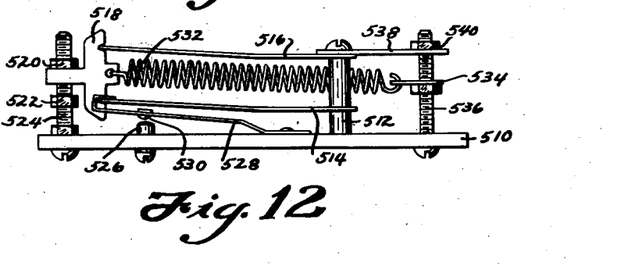
Fig. 12 is a view in elevation of still another form of thermostat showing my invention.

In Fig. 12 there is shown another double bimetal control similar to the effective temperature control shown in Fig. 1. In this control the base 510 is provided with the post 512 which supports one end of the spaced cantilever bimetal blades 514 and 516. The other free end of these bimetal blades is received within notches formed in the arm of a cross-shaped member 518 having one arm operating between the differential adjusting nuts 520 and 522 which are threaded upon the screw 524 extending upwardly from the base 510. These nuts 520 and 522 limit the movement of the cross-shaped member 518 and thereby limit the movement of the free end of the spaced parallel bimetal blades 514 and 516.

A stationary contact 526 is fastened to the base 510 as is one end of a spring contact support 528 which has its other end hooked over the free end of the lower bimetal blade 514. This spring contact support is provided with a movable contact 530, and a spring contact support 528 is provided with a sufficient spring force to normally hold the contacts 530 and 526 in contact with each other with sufficient contact pressure. A tension type coil spring 532 is connected to the arm of the cross-shaped member 518 between the free ends of the blades 514 and 516 for holding the cross-shaped member 518 into contact with the ends of the blades and also for providing a critical load upon the free end of the bimetal blades. The other end of the spring 532 is hooked onto the adjusting member 534 which is threaded onto the adjusting screw 536 which is rotatably mounted in the base 510 and is supported by a metal member 538 extending from the post 512. The adjusting screw 536 above member 538 is provided with a nut 540 soldered to it. This construction provides a simple, compact form of control which may, like the other forms, be readily adjusted.

While the forms of embodiment of the invention as herein disclosed, constitutes preferred forms, it is to be understood that other forms might be adopted, all coming within the scope of the claims which follow.

What is claimed is as follows:

1. A thermostatic control comprising a resilient bimetal strip, means for supporting the bimetal strip, in cantilever fashion, spring means having one end connected to the strip at a point remote from its supporting point, an anchorage for the other end of said spring means located adjacent the support for the strip, said spring means exerting its major component of force along said bimetal trip toward its point of support, a control means operated by the movement of said bimetal strip, and means for adjusting in a direction substantially perpendicularly to said bimetal strip the anchorage for said spring means for changing the temperatures at which the bimetal strip operates.

2. A thermostatic control comprising a resilient bimetal strip, means for supporting the bimetal strip in cantilever fashion, a tension type spring means having one end connected to the strip at a point remote from its supporting point, an anchorage for the other end of said spring means, said spring means exerting its major component of force along said bimetal strip toward its point of support, a control means operated by the movement of said bimetal strip, means for limiting the movement of said bimetal strip, said spring means being provided with a tension sufficient to cause the bimetal strip to snap from one limit of movement to another, and adjusting means for moving said anchorage substantially perpendicularly to said bimetal strip for changing the temperatures at which the bimetal strip snaps from one limit of movement to the other.

3. A thermostatic control comprising a resilient bimetal strip, means for supporting the bimetal strip in cantilever fashion, spring means having one end connected to the strip at a point remote from its supporting point, an anchorage for the other end of said spring means, said spring means exerting its major component of force along said bimetal strip toward its point of support, a control means operated by the movement of said bimetal strip, means for limiting the movement of said bimetal strip, said spring means being provided with a tension sufficient to cause the bimetal strip to snap from one limit of movement to another, adjusting means for moving said anchorage substantially perpendicularly to said bimetal strip for changing the temperatures at which the bimetal strip snaps from one limit of movement to the other, and a second adjusting means for adjusting the tension of said spring means in the direction of its axis.

4. A thermostatic control comprising a resilient bimetal strip, means for supporting said strip in cantilever fashion, spring means having its axis extending substantially in alignment with said bimetal strip, said spring means being connected at one end to said bimetal strip at a point remote from its support, an anchorage for the other end of said spring means located adjacent the support for the strip, a control means operated by the movement of said bimetal strip, and means for adjusting said anchorage generally perpendicularly to said bimetal strip, for adjusting the temperatures at which the strip operates the control means.

5. A thermostatic control comprising a generally straight resilient bimetal strip, means for supporting said strip in cantilever fashion including a stationary anchorage for immovably anchoring one portion of said strip, spring means having its axis extending substantially parallel to said bimetal strip for applying a critical column loading to said strip, said spring means being connected at one end to said bimetal strip at a point remote from its support, an anchorage for the other end of said spring means, a control means operated by the movement of said bimetal strip, and means responsive to changes in humidity for exerting a force generally in a lateral direction directly upon the resilient cantilever arm portion of said bimetal strip.

6. A thermostatic control comprising a resilient bimetal strip, means for supporting said strip in cantilever fashion, spring means having its axis extending substantially in alignment with said bimetal strip, said spring means being connected at one end to said bimetal strip at a point remote from its support, an anchorage for the other end of said spring means, a control means operated by the movement of said bimetal strip, and means including a suspended member capable of absorbing and expelling moisture according to changes in humidity of the surrounding atmosphere for exerting a force in accordance with its weight upon said bimetal strip in its normal direction of movement.

7. A temperature control comprising a resilient bimetal strip, means for supporting said strip in cantilever fashion including a stationary anchorage for immovably anchoring one portion of said strip, a control means operated by the movement of said strip, and means including an element whose weight changes with changes in humidity for exerting a force in accordance with its weight upon the resilient cantilever arm portion of said bimetal strip in the normal direction of movement of said strip.

8. A temperature control comprising a thin resilient metal strip, means for supporting said strip intermediate the ends thereof, spring means having the ends connected to said strip upon opposite sides of the supporting means, a control means operated by a portion of the strip on one side of the supporting means, and means for moving a portion of said strip upon the other side of the supporting means for operating the control means.

9. A temperature control comprising a thin resilient metal strip, means for supporting said strip intermediate the ends thereof, means for limiting the movement of a portion of the strip upon one side of the supporting means, spring means having the ends connected to said strip upon opposite sides of the supporting means, a control means operated by the portion of the strip having the limited movement, said spring means having such a force as to impose a critical stress upon said metal strip to cause the portion of the strip operated by the control means to snap from one limit of movement to the other, and means for moving said strip to cause it to snap from one position to another to operate the control means.

10. A thermostatic control comprising a resilient bimetal strip, means for supporting the bimetal strip in cantilever fashion, spring means having one end connected to the strip at a point remote from its supporting point for applying a critical column loading to said strip, an anchorage for the other end of said spring means, said spring means exerting its major component of force along said bimetal strip toward its point of support, a control means operated by the movement of said bimetal strip, and means for adjusting in a direction substantially perpendicularly to said bimetal strip the anchorage for said spring means for changing the temperatures at which the bimetal strip operates.

11. A switch mechanism including a movable member, contact means operated by said movable member, a toggle spring means for said movable member including a plurality of spring sections connected by a threaded member.

12. A switch mechanism including a movable member, contact means operated by said movable member, a toggle spring means for said movable member including a plurality of spring sections having their adjacent end portions threaded onto a threaded member.

13. A thermostat control comprising a plurality of generally parallel resilient strips, one of said strips being formed of bimetal, means for supporting said strips in cantilever fashion, means for connecting the free ends of said strips to cause them to operate together, a control means operated by the movement of one of said strips, spring means acting upon said connecting means and exerting its major component of force parallel to said resilient strips toward their points of support for applying a critical column loading to each of the strips, said spring means being provided with a tension sufficient to cause the strips to snap from one position to another.

14. A thermostat control comprising a generally horizontal resilient bimetal strip, stationary anchorage means for immovably supporting one portion of the strip, a member capable of absorbing and expelling moisture according to changes in humidity of the surrounding atmosphere, said member having its weight exerted upon the unanchored portion of said strip for deflecting with respect to said anchorage said unanchored portion according to its weight, and a control device operated by the deflection of said second portion.

15. A thermostat control comprising a generally horizontal resilient bimetal strip, means for supporting one portion of the strip in cantilever fashion including a stationary anchorage for immovably anchoring one portion of said strip, a member capable of absorbing and expelling moisture according to changes in humidity of the surrounding atmosphere, said member having its weight supported by the free end of said strip for deflecting with respect to its anchorage the free end according to its weight, spring means connected to the free end of said strip and exerting the major component of its force along the strip in the direction of its support for applying a critical column loading to said strip, and control means operated by the deflection of the free end of said strip.

16. A thermostatic control comprising a resilient bimetal strip, means for supporting said strip in cantilever fashion including stationary anchorage means for immovably anchoring one portion of said strip, spring means having its axis extending substantially parallel to said bimetal strip, said spring means being connected at one end to said bimetal strip at a point removed from its support for applying a critical column loading to said strip, an anchorage for the other end of said spring means, a control means operated by the movement of said bimetal strip, and means including a suspended member capable of absorbing and expelling moisture according to changes in humidity of the surrounding atmosphere for exerting a force in accordance with its weight directly upon the resilient cantilever arm portion of said bimetal strip to deflect the strip with respect to its anchorage in its normal direction of movement.

GEORGE C. PEARCE.